United States Patent

De Witt

[15] 3,663,760

[45] May 16, 1972

[54] METHOD AND APPARATUS FOR TIME DIVISION MULTIPLEX TRANSMISSION OF BINARY DATA

[72] Inventor: Russell G. De Witt, Berkeley Heights, N.J.

[73] Assignee: The Western Union Telegraph Company, New York, N.Y.

[22] Filed: July 8, 1970

[21] Appl. No.: 53,082

[52] U.S. Cl. ....................179/15 BA

[51] Int. Cl. ....................H04j 3/06

[58] Field of Search ....................179/15 BA, 15 BS; 178/50

[56] References Cited

UNITED STATES PATENTS

| | | | |
|---|---|---|---|
| 3,461,245 | 8/1969 | Johannes et al. | 179/15 BS |
| 3,093,815 | 6/1963 | Karnaugh | 340/173 |
| 3,420,956 | 1/1969 | Heightley et al. | 179/15 BS |
| 3,504,287 | 3/1970 | Deregnavcourt | 179/15 BS |
| 3,484,555 | 12/1969 | Ching et al. | 179/15 BS |
| 3,310,626 | 3/1967 | Cassidy | 178/50 |

*Primary Examiner*—Kathleen H. Claffy
*Assistant Examiner*—David L. Stewart
*Attorney*—Michael I. Borsella

[57] ABSTRACT

A method and apparatus for transmitting a binary data stream over a channel of a multiple channel time division multiplex transmission system wherein the channel includes N consecutively occurring transmission digit slots. Method and apparatus elements are provided for employing a pulse stuffing technique wherein the $(N-1)$th transmission digit slot is periodically stuffed high and the Nth digit slot is transmitted in the low state on each occurrence of the stuffing to signal the receiving facility of the stuffing. The $(N-1)$th slot when not stuffed and the remainder of the N digit slots are employed to transmit the binary data. The stuffing and signalling are performed sufficiently frequent to provide a long term average digit rate of the digit slots transmitting the data equal to the digit rate of the binary data stream.

10 Claims, 7 Drawing Figures

INVENTOR:
RUSSELL G. DeWITT
BY [signature]
ATTORNEY.

Patented May 16, 1972

3,663,760

5 Sheets-Sheet 2

INVENTOR:
RUSSELL G. DeWITT
BY William A. [signature]
ATTORNEY.

Patented May 16, 1972

3,663,760

5 Sheets-Sheet 3

METHOD AND APPARATUS FOR TIME DIVISION MULTIPLEX TRANSMISSION OF BINARY DATA

BACKGROUND OF THE INVENTION

This invention relates to time division multiplex transmission of data and more particularly to transmission of binary data over a predetermined channel of a time division multiplex transmission system in which the long term average digit rate of the channel exceeds the average digit rate of the data.

Pulse code modulation (PCM) transmission systems have been used to transmit a number of separate voice signals over a single circuit. These systems have also been used to transmit a number of separate voice and data signals and are sometimes referred to as time division multiplex (TDM) transmission systems. The transmission format is usually made up of a number of channels, successively transmitted, in which each of the channels is made up of a number of digits or time slots. A good example of a TDM transmission system which utilizes this type of format is that described by C.G. Davis in the January, 1962 issue of the Bell System Technical Journal for transmission of 24 separate voice signals over a single circuit. The format is made up of 24 channels each having eight time slots. The 24 channels make up a complete transmission frame or format. The transmission frame is repeated 8,000 times a second. Thus, each channel recurs for transmission once for every framing period which, in this example, is 1/8,000th of a second. Each channel is transmitted over a time interval equal to the time required to transmit its time slots. It can be seen that the 24 eight-bit channels result in 192 time slots for each frame. A 193rd time slot is added to permit framing or synchronization of the receiver with the transmitting facility. Since the transmission format is repeated 8,000 times a second, 1.544 million time slots, or digits, per second are transmitted. This transmission format along with the repeated line facilities used in its transmission is presently known as the T-1 carrier.

In order to use a channel of the TDM transmission system to transmit binary data, the capacity of the channel must be sufficiently high to carry the data. This capacity can best be evaluated by observing the long term average digit rate of the transmission channel. This average digit rate is the number of time slots available in the channel multiplied by the channel's repetition rate. For example, a T-1 channel has a long term average digit rate of eight time slots multiplied by 8,000 occurrences per second, or 64.0 kilobits per second. Notwithstanding that this capacity is not uniformly spaced in the time scale, it is, nonetheless available for carrying data at such an average rate. Ideally then, if the data is introduced at an average rate equal to the long term average digit rate of the channel all that is required of a channel unit, for loading the data into the transmission system, is a simple buffer store to hold the data, in the form of bytes, until the transmission channel occurs and to release the data at the same rate as the time slot rate of the channel for transmission. Such a channel unit would entail a minimum of complexity and can be designed as a plug-in module for enhanced flexibility of the system.

Unfortunately however, the data is not always available at a rate equal to the channel's average digit rate. If the data is faster, then an additional channel of the transmission system must be allocated to carry the data. On the other hand if the data rate is slower, then the channel unit must be modified to transmit certain predetermined time slots blank, or without data. The difficulty with this approach is that data from another source, at a slightly different rate, cannot be transmitted by the same channel unit having predetermined blank time slots.

The channel unit proposed in accordance with the present invention is capable of processing a variety of data from sources at various speeds and has a minimum impact on the design of the balance of the transmission system. Furthermore, the channel unit hereinafter described can be arranged to be interchangeable in the transmission system with other channel units such as, for carrying voice, or other data, such as, for example, slow speed data signals including telegraph signals.

SUMMARY

Briefly stated, one aspect of the present invention resides in apparatus for transmitting binary data over a predetermined channel of a multiple channel time division multiplex transmission system wherein the data is first introduced into the system from a source at an average first digit rate and wherein the long term average digit rate of the predetermined channel exceeds the average first digit rate. The apparatus includes, means at the transmitting terminal of the transmission system for storing the binary data at least until a plurality of digits thereof is received into the apparatus for transmission over the predetermined channel, and means at the transmitting terminal for transmitting the stored data in the form of digital bytes comprised of a plurality of the data digits over the predetermined channel on the occurrence of the channel. The apparatus further includes means at the transmitting terminal for periodically stuffing at least one time slot of the predetermined channel to provide a long time average effective digit rate of the channel substantially equal to said average first digit rate of the binary data, and means in the receiving terminal of the transmission system for reconstructing the binary data less the stuffed time slot at an average digit rate substantially equal to the first digit rate of the binary data.

In accordance with a preferred embodiment of the invention, the apparatus includes, means at the transmitting terminal of the transmission system for storing the data at least until a plurality of digits thereof is received into the apparatus for transmission over the predetermined channel, and means at the transmitting terminal for transmitting the stored data in the form of digital bytes over the predetermined channel on the occurrence of the channel. The apparatus further includes means at the transmitting terminal for reading prior to transmission thereof the binary data out of the storing means at an instantaneous digit read-out rate substantially equal to the average digit rate of the predetermined channel, and means at the transmitting terminal for periodically stuffing the aforementioned data read-out of the storing means to periodically stuff at least a first time slot of the predetermined channel and for providing a stuffing indicating signal in another time slot of the predetermined channel to signal the receiving terminal of the transmission system on each occurrence of the aforementioned stuffing. The stuffing and signalling are performed sufficiently frequent to provide an average read out rate of the binary data from the storing means at a rate substantially equal to the aforementioned average first digit rate of the data. The apparatus further includes, means at the receiving terminal for storing the received digits of the channel at least until the entire byte of the channel is received, detecting means at the receiving terminal for detecting the stuffing indicating signal in the aforementioned other time slot, and means responsive to the detecting means for reconstructing the binary data at an average recovery digit rate substantially equal to the aforementioned first digit rate by reading out of the receiving terminal storing means at said recovery digit rate the received digits of the channel less the digits used for stuffing and signalling.

Yet another aspect of the present invention resides in a method for transmitting binary data over a predetermined channel of a multiple channel time division multiplex transmission system wherein the binary data is first introduced from a source thereof at an average first digit rate and wherein the long term average digit rate of the predetermined channel exceeds the binary data first digit rate. The method of the invention includes the steps of, periodically stuffing a first time slot of the predetermined channel and providing a stuffing indicating signal in another time slot thereof on each occurrence of said stuffing to signal the receiving facility of the transmission system of the occurrence of the stuffing. The stuffing and signalling are performed sufficiently frequent to provide an effective average digit rate of the time slots of the channel, when not used for the aforementioned stuffing and signalling, substantially equal to the first digit rate of the binary data. The method includes the further steps of, arranging the data in the form of digital bytes for the transmission of a byte on each occurrence of the channel wherein each byte includes a plurality of the data digits sufficient in number to provide an average transmission rate of the binary data substantially equal to he aforementioned first digit rate, sequentially transmitting the bytes one on each occurrence of the channel, and reconstructing the binary data at the receiving facility of the transmission system by reconstructing the received data of the time slots carrying binary data. The reconstructing is performed at an average digit rate substantially equal to the first digit rate of the binary data. Thus, binary data introduced from a source at a given digit rate can be transmitted over a higher speed channel, and at the receiving terminal the data can be reconstructed at a rate equal to the given digit rate.

In view of the foregoing it is an object of the present invention to provide improved apparatus for time division multiplex transmission of data.

It is another object of the invention to provide apparatus for time division multiplex transmission of data over a predetermined channel of a time division multiplex transmission system.

It is yet another object of the invention to provide apparatus for transmission of data over a predetermined channel of a time division multiplex transmission system wherein the average digit rate of the channel exceeds the digit rate of the data and wherein one time slot of the channel is normally transmitted stuffed.

It is another object of the present invention to provide an improved method for time division multiplex transmission of data.

It is yet another object of the invention to provide a method for transmitting data over a predetermined channel of a time division multiplex transmission system wherein the average digit rate of the channel exceeds the digit rate of the data.

These and other objects, advantages and features of the invention, will be more fully understood by referring to the following descriptions and claims, taken in conjunction with the accompanying drawings.

DESCRIPTIONS OF THE PREFERRED EMBODIMENT

Figures 1A, 1C:
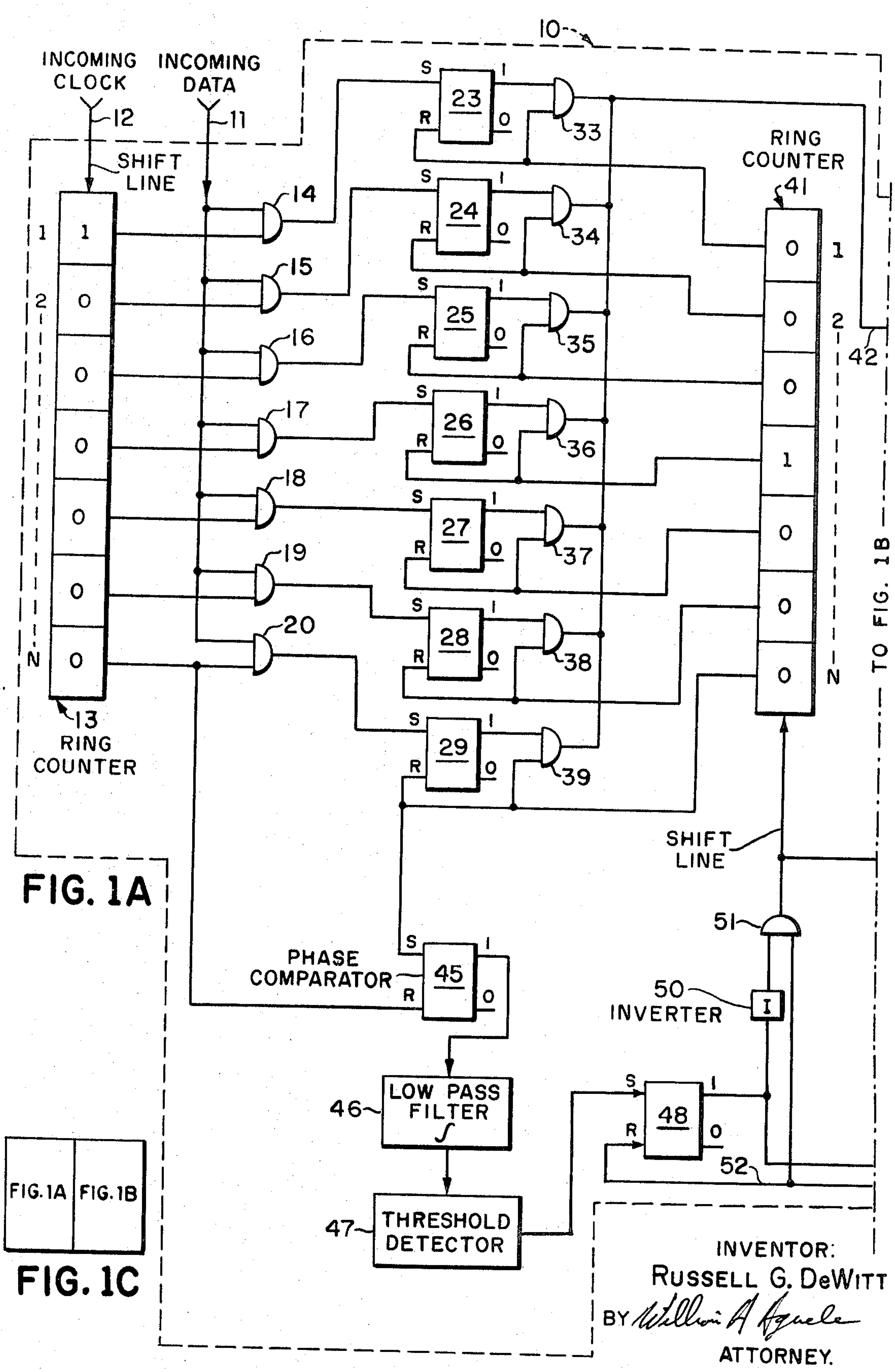
FIGS. 1A and 1B placed side by side as shown in FIG. 1C constitute a block diagram schematic of a transmitting channel unit illustrating features of the present invention in connection with a TDM transmission facility.
Figure 1B:
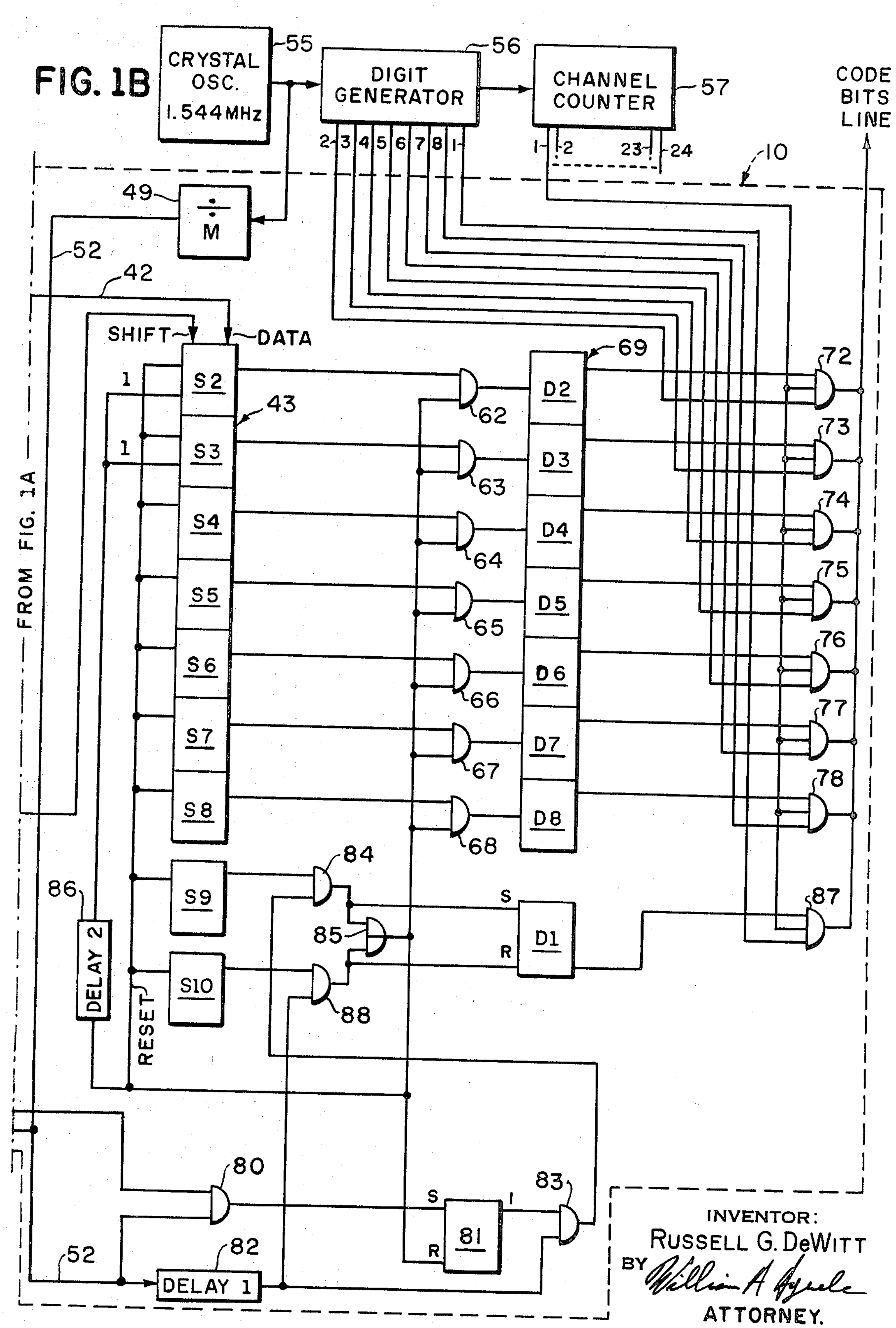

Referring now to FIGS. 1A and 1B which together, illustrate, in block form, a data channel unit in accordance with the present invention for use in conjunction with a T-1 transmission system, the data channel unit is illustrated within the dotted block 10. As indicated above, a channel of the T-1 transmission system includes eight time slots. Seven of these time slots will be used to carry data, and at least one time slot will always be transmitted in a stuffed condition to insure that the repeaters of the transmission line facilities receive sufficient pulses to keep their clocks operative.

Binary data having a rate of about 50 kilobits per second is introduced into the channel unit 10 after passing through appropriate input connection equipment, not shown, and enters the channel unit through input conductor 11. In this example the input binary data is of the non-return-to-zero type. Hence, there is no timing information inherent in the input data signal. Accordingly, a clock signal is provided from the same source which is synchronous with the data. The clock signal is introduced into the channel unit 10, through a conductor 12, which acts as the shift line of a ring counter 13. The ring counter includes a number of series connected stages of bistable circuits in which the last stage is in turn connected to the first stage to form a ring configuration. A high, or "one," is preset in the first stage which is shifted to successive stages by successive pulses of the incoming clock signal. Thus, the "one" is continuously shifted around the ring from the first stage, through all the stages back to the first stage, and so on, in synchronism with the incoming data. The conductor 11 carrying the incoming data is connected to the first input of each of a number of AND gates 14–20 which are equal in number to the number of stages of the ring counter 13.

It should be noted that if the incoming data is of the return-to-zero type an incoming clock signal is not required since timing is inherent in such a signal and can be readily extracted therefrom. Also, it can be seen that the incoming data need not be in serial form and can be in parallel form which would then be applied directly to the gates 14–20.

The output of the gates 14–20 are each connected to the set terminal of a group of bistable circuits or flip-flops, 23–29. The bistable circuits 23–29 are of the conventional type which provide a reference voltage at their "one" output terminal when in the set condition and provide a zero voltage at the "one" terminal when in the reset condition. The "one" terminals of the bistable circuit 23–29 are respectively connected to the first input terminals of a set of AND gates 33–39. The second inputs of the AND gates 33–39 are respectively connected to the reset terminals of the bistable circuits 23–29 and are also respectively connected to the successive stages of a second ring counter 41, which is essentially the same as the ring counter 13.

It will be understood by those skilled in the art that the desired number of stages of the two ring counters and the bistable circuits will depend upon the expected variation, or tolerance, of the incoming data rate and the associated clock signal since these circuits operate essentially as a buffer store. Also, for the same reason, the preferred number of these stages depends upon the difference between the incoming data rate and the average digit rate of the channel. Typically, successful operation can be expected if about five stages of these circuits are used when transmitting a 50 kilobit per second data signal over a T-1 channel.

As the incoming data enters the system through conductor 11, it is applied to the gates 14–20. As the preset high of the ring counter 13 is shifted by the incoming clock signal, it permits the corresponding successive data digits of the incoming data signal to pass through the gates 14–20 sequentially. The bistable circuits 23–29 act essentially as an elastic store between the ring counters 13 and 41. Thus, the bistable circuits are successively set or left unset depending upon the condition, or state of the data digit applied to each of these bistable circuits. The data remains in the bistable circuits until withdrawn by action of the ring counter 41. This counter includes a preset high which is approximately 180° out of phase with the preset high of the ring counter 13. The ring counter 41 is shifted by an internally generated clock signal which has a pulse rate synchronous with the long term average digit rate of the transmission channel. As the preset high of the counter 41 is shifted from stage to stage, it sequentially applies a high to the input terminals of the gates 33–39. It also successively applies a high to the respective reset terminals of the bistable circuits 23–29. As each of the gates 33–39 receive this high, the stored data in the bistable circuits is sequentially released in the order stored, but at an instantaneous read out rate equal to the average digit rate of the transmission channel. The bistable circuits 23–40 are reset by the same high of the ring counter 41 which reads out the data thereby readying the store to receive additional data. The data read-out from the store is carried in serial form by a conductor 42 to the input stage of a shift register 43 illustrated in FIG. 1B.

Since the read-out rate from the elastic store exceeds the rate of the incoming data, the ring counter 41 will tend to overtake the ring counter 13. A phase comparator in the form of a bistable circuit 45, is provided, having its set terminal connected with he last stage of the ring counter 41 and having its reset terminal connected with the last stage of the ring counter 13. The "one," or high, terminal of the phase comparator 45 is connected with an integration circuit 46 in the form of a low pass filter. The output of he integration circuit 46 is in turn carried to a threshold detector 47.

Figure 3:
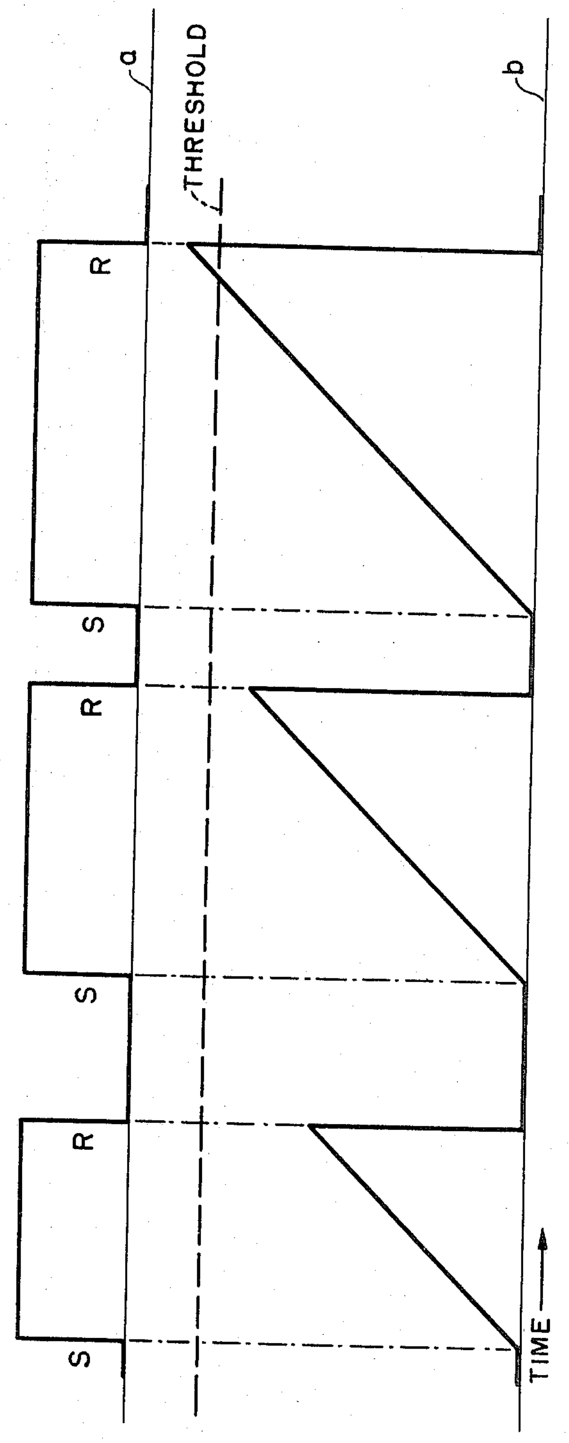
FIG. 3 is a time diagram showing on line *a* the time relationship of successive set and reset events of the phase comparator 45 and showing on line *b* the resulting successive outputs of the associated integration circuit 46 of FIG. 1A.

The reset of the phase comparator 45 keeps occuring later and later with respect to the set because of the difference between the incoming clock signal associated with the shifting of the counter 13 and the internally generated clock signal which shifts the counter 41. This is illustrated in FIG. 3 where line *a* is a time diagram showing the set and reset events occurring successively further apart on the time scale. The time interval between the set and reset is integrated by the integration circuit 46 for each occurrence. This is illustrated on line *b* of FIG. 3. Thus, the output of the integration circuit 46 reaches a higher level in each successive cycle until it finally crosses a predetermined threshold level which is preset in the threshold detector 47. When this level is exceeded, the threshold detector emits a pulse which is carried to the set terminal of a bistable circuit 48, which when set, provides a high output at its "one" terminal. This terminal is in turn connected with a conventional inverter 50 which provides an output at all times except when it receives an input from the bistable circuit 48. The output of the inverter is in turn carried to a first input terminal of an AND gate 51. The second input terminal of the gate 51 is connected with a conductor 52 which carries the internally generated clock signal for shifting the ring counter 41. The output of the gate 51 is connected with the last stage of the ring counter 41 for applying the internally generated clock signal to shift this counter. The reset terminal of the bistable circuit 48 is connected with the conductor 52 so that this circuit is immediately reset on the next beat of the internally generated clock signal. Thus, when the aforementioned threshold is exceeded, the shifting of the ring counter 41 and the associated reading out of the stored data are inhibited for a single beat of the internally generated clock signal.

It can be seen that this inhibiting happens sufficiently frequent to prevent the ring counter 41 from overtaking the ring counter 13. The result is that the incoming data is read out of the elastic store at an average rate equal to its own incoming digit rate. This phenomena is substantially independent of the incoming digit rate and the system adjusts itself simply by causing the aforementioned inhibiting to occur more or less often depending upon the incoming digit rate. Also it can be appreciated that the exact value of the threshold level in the detector 47 is not critical due to the self-adjusting feature of the differing rates between the two ring counters.

Referring now to FIG. 1B, a conventional crystal oscillator 55 is shown outside the channel unit for providing the 1.544 Mhz timing signal for the transmission format. This timing signal is carried to a conventional digit generator 56 which sequentially provides the eight digit pulses making up each channel of the transmission format. The timing signal is also carried to a clock dividing down circuit 49, in the channel unit, which provides the aforementioned internally generated clock signal in the conductor 52.

The digit generator 56, is connected with a conventional channel counter 57, which provides a channel pulse for each channel of the transmission format in which the duration of the pulse is equal to 8 digits of the digit generator. The eight digit signals from he digit generator 56, and the channel 1 signal, from the channel counter 57, are carried to the data channel unit 10 to control the output thereof.

The shift register 43 includes 9 stages, S2 through S10, inclusive. The first seven stages, S2–S8, are connected to the respective first input terminals of a set of seven AND gates 62–68 which operate to clear these stages of the register. The output of the gates 62–68 are respectively connected to each of seven stages D2 through D8 of a buffer store 69. The outputs of these stages are respectively connected to a set of 7 transmission AND gates 72–78. The latter gates are each, in turn, connected with the channel counter 57 to enable these gates during the occurrence of the predetermined channel for transmission. In the embodiment illustrated, these gates are connected with the channel 1 terminal of the counter. The transmission gates are also connected with the respective digit terminals of the digit generator 56 such that the gate 72 is enabled by the occurrence digit 2, the gate 73 is enabled by the occurrence of digit 3, and so on, so that during the successive occurrence of digits 2 through 8, the gates are enabled to pass the digits in the buffer store successively for transmission. The output of the transmission gates 72–78 is carried by a single conductor from the channel unit 10 to the balance of the transmission equipment where this output is joined with the outputs of the other channel units carrying such information as voice, or other data, similarly time division multiplexed.

The purpose of the shift register 43 is to arrange the serial read out of the elastic store in the form of bytes of either six or seven digits for transmission on each occurrence of channel 1 so that the long term average digit rate of these bytes is equal to the average digit rate of the data introduced into the system for transmission. When there is no inhibiting of the read out, it is desired to transmit data in seven time slots of the channel and to stuff the eighth time slot to insure sufficient pulses being transmitted to keep the clock circuits of the transmission line repeaters operative. When the read-out from the elastic store is inhibited, as described above, it is desired to transmit data in six time slots, to stuff the next to last time slot, and to transmit a zero in the eighth time slot in order to instruct the receiving facility that the next to last time slot was not transmitted with data, but rather, was stuffed.

The "one" output terminal of the bistable circuit 48 is connected with a first input terminal of an AND gate 80. The second input terminal of the gate 80 is connected with the conductor 52 carrying the internally generated clock signal. Thus, when the aforementioned threshold is reached, the bistable circuit 48 is set providing an input to the gate 80. The following beat of the internal clock signal causes an output of the gate 80 which is in turn carried to the set terminal of a bistable circuit 81 to set this bistable circuit. A time delay circuit 82 is provided which is connected with the conductor 52 so that the same beat of the internal clock which set the bistable circuit 81 is delayed for a short period of time enabling this circuit to complete its setting and the delayed beat is then carried to a first input terminal of an AND gate 83. The second input terminal of the gate 83 is connected with the "one" output terminal of the bistable circuit 81. Thus, the beat of the internal clock which follows the attainment of the threshold level is caused to be inhibited from shifting the ring counter 41 by operation of the bistable circuit 48 and the same beat, slightly delayed, appears as an output of the gate 83.

The output of the gate 83 is connected to a first input terminal of an AND gate 84, the second input terminal of which is connected with the S-9 stage of the shift register 43 to sense the state of this stage. The output terminal of the gate 84 is connected with the input of an OR gate 85, the output terminal of which, is, in turn, parallel connected with the respective second inputs of the gates 62 through 68. Thus, when an output signal is present from the OR gate 85, the gates 62–68 are enabled so that the data then present in the S2 through S8 stages of the shift register are cleared and passed along to the D2 through D8 stages of the buffer store 69.

The clear signal from the output of the OR gate 85 is also applied to all of the register stages S-2 through S-10 to reset the register. The same signal is passed through a time delay 86 to delay it long enough for the shift register to be reset, and then this signal is applied to the S2 and S3 stages to pre-set these stages in the high condition. As subsequent data is received by the shift register, the highs in the S2 and S3 stages are shifted to successive higher stages. A shift signal from the output of the gate 51 is applied to the S2 stage of the shift register to shift the register in synchronism with the data received from the elastic store.

Let us imagine that the threshold of the detector 47 is exceeded at some time when the preset highs of the shift register are somewhere in the center stages, for example, in the S4 and S5 positions. At this point, the bistable circuits 48 and 81 become set, the ring counter 41 is inhibited from reading out data from the elastic store for the next beat of the internally generated clock signal, and the shift register is inhibited from shifting for the same beat. The bistable circuit 81 remains in its set condition until it receives a reset signal at its reset terminal which is connected with the OR gate 85 so that it will be reset by the clear signal. The bistable circuit 81 causes gate 84 to be enabled. The beat of the internal clock signal which is inhibited from shifting the ring counter and shift register, resets the bistable circuit 48 through conductor 52, so that subsequent beats of the internal clock signal will normally shift the ring counter and shift register. Thus, the shifting is inhibited only for a single beat of the internal clock signal when the aforementioned threshold is exceeded. While bistable circuit 81 remains in the set condition, subsequent shifting of the shift register will advance the preset highs of the S2 and S3 stages to subsequent stages until the preset high of S3 reaches the S9 position. At this point, this high enables gate 84 which provides an output at the OR gate 85, causing the shift register to clear. The output of the gate 84 is also carried to the set terminal of a D1 stage in bistable form, of the buffer store 69. The output terminal of this stage is connected to a transmission AND gate 87, which is also connected with the digit generator to receive the digit 1 enable signal therefrom and is also connected with the channel counter to receive the channel 1 enable signal. The D1 stage of the store 69 is wired to provide a zero output when it is in the set condition and to provide a one output when it is in the reset condition. Thus, the channel byte transmitted following the occurrence of an inhibited shift is transmitted with a zero in the D1 time slot, and a stuffed 1 in the D8 time slot as a result of the pre-set high in the S2 stage of the shift register which is cleared from the S8 stage at the occurrence of the clear signal from the gate 85. The output of the gate 85 resets the bistable circuit 81 readying it for the next occurrence of an inhibit.

When there is no inhibit, the data in the shift register, along with the preset highs of S2 and S3 stages, are shifted until the S3 high reaches the S10 stage. At this point, the output of S10 is sensed by an AND gate 88. A second input of the gate 88 is taken from the output of the delay circuit 82 so that the same beat of the internal clock which advanced the S3 high from S9 to S10, but slightly delayed, enables gate 88 to pass the S3 high to the OR gate 85 where it causes clearing of the shift register to the buffer store 69. The output of the gate 88 is carried to reset terminal of the D1 stage of the store 69 so that this stage is set and provides a 1 at its output. Thus, all channel bytes transmitted when no inhibit takes place are transmitted with a D1 time slot stuffed high and with valid data in D2 through D8 time slots. It can be seen therefore that when the D1 time slot is transmitted having a zero, it is able to inform the receiving facility that only time slots D2 through D7 carry valid data and D8 slot was transmitted stuffed.

Figure 2A:
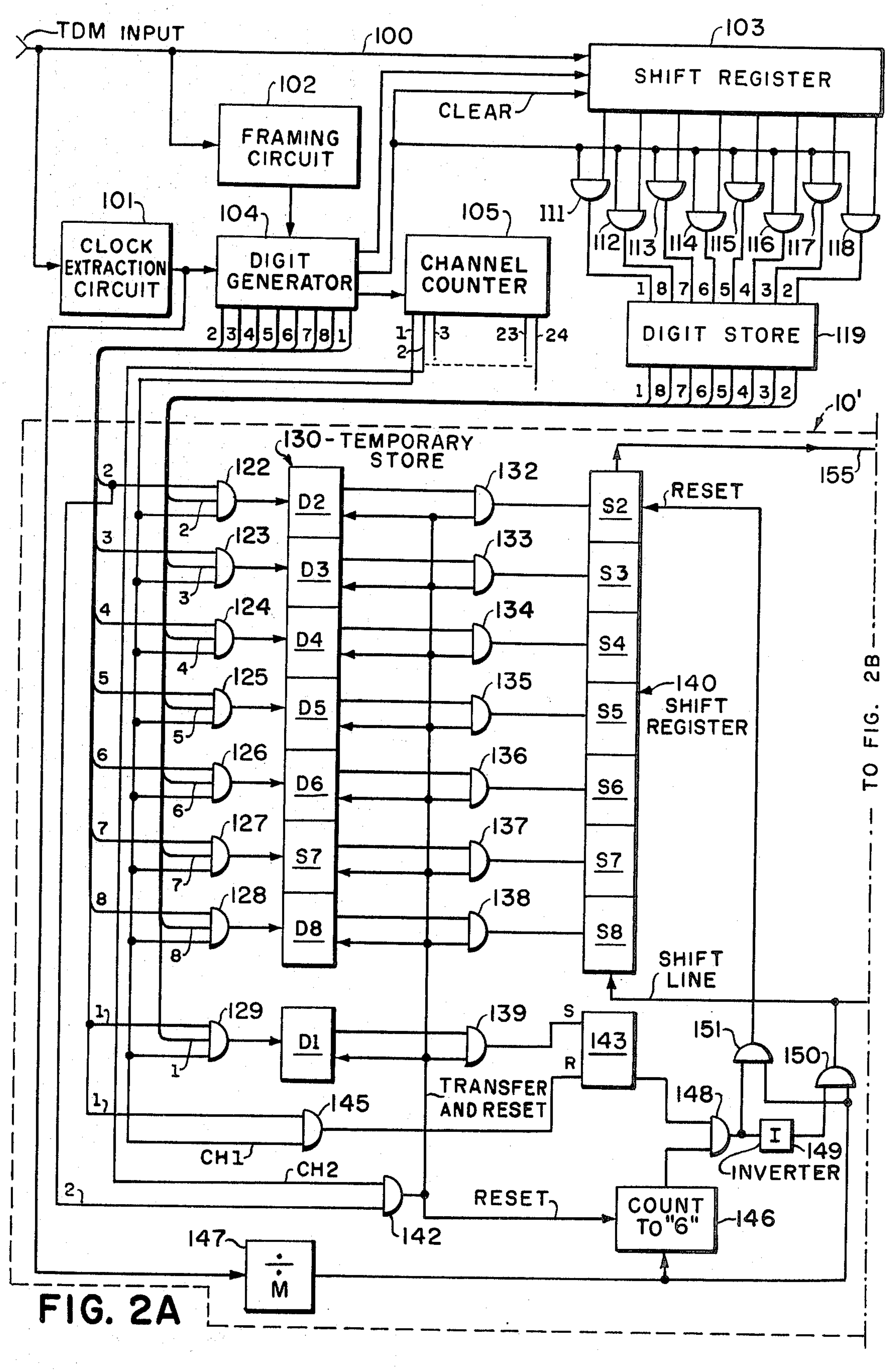
FIGS. 2A and 2B placed side by side as shown in FIG. 2C constitute a block diagram schematic of a receiving channel unit illustrating features of the present invention in connection with a TDM receiving facility.
Figures 2B, 2C:
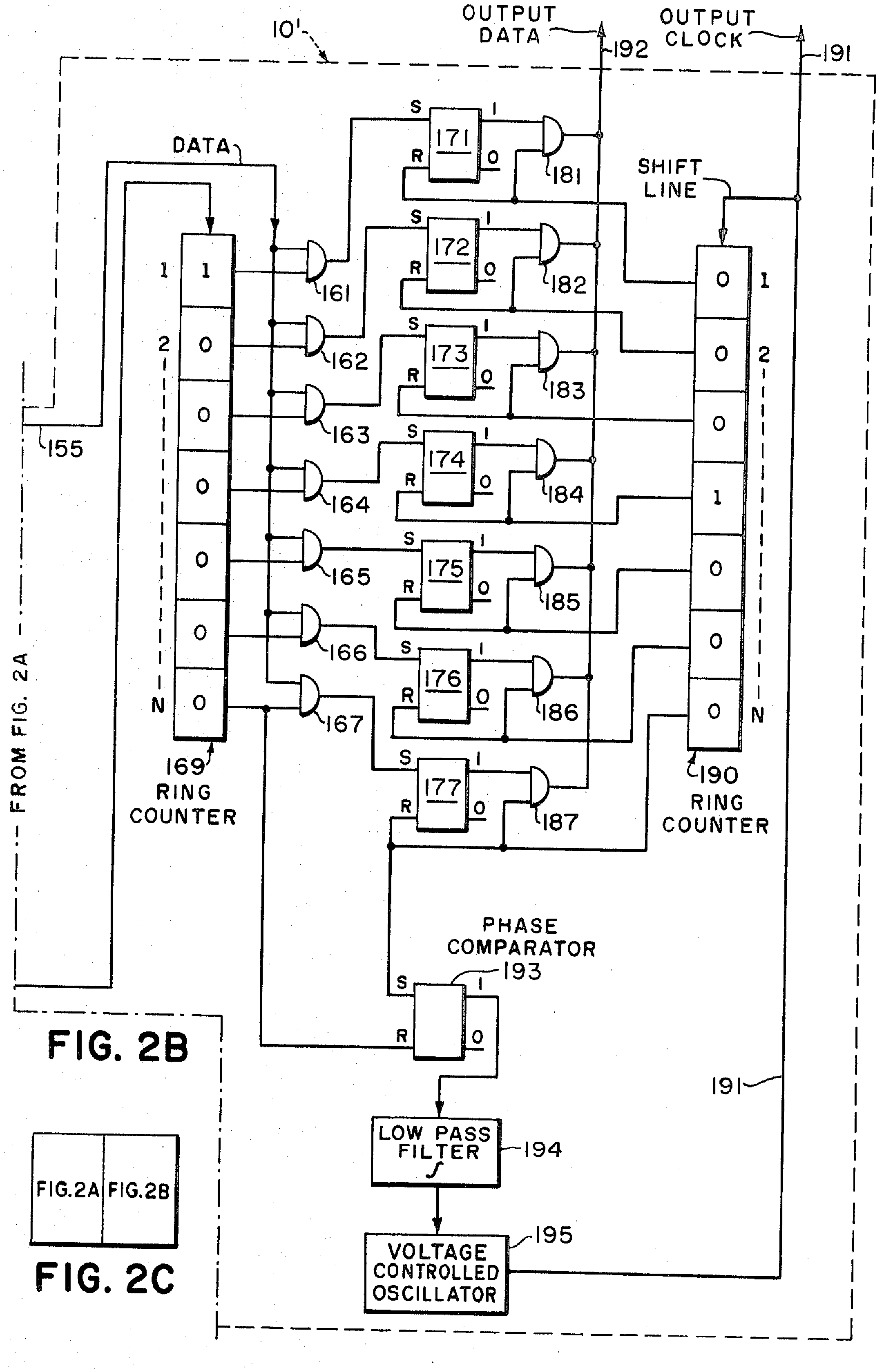

Referring now to FIGS. 2A and 2B, which together illustrate a receiving channel unit 10' in the receiving facility of the transmission system. The received TDM signal carrying all 24 channels is introduced through a conductor 100. This input is carried to a clock extraction circuit 101, a conventional framing circuit 102, and a shift register 103. The clock extraction circuit 101 extracts the 1.544 Mhz timing inherent in the received TDM signal and applies a corresponding pulse signal to a digit generator 104 which, in turn, repeatedly provide eight successive digit pulses and respectively places them on eight common digit busses in the receiving apparatus. The digit generator also applies a shift signal to the shift register 103 to shift the register in synchronism with the received digits of the TDM signal. The framing circuit 102 is responsive to the framing digit transmitted in the 193rd time slot essentially in the manner described in the aforementioned article appearing in the Bell System Technical Journal. This circuit applies a shifting signal to the digit generator 104 to keep the digit generator in synchronization with the transmitter.

The successively received digits of each channel are shifted into the shift register 103 until the last digit, D1 is entered. Then, a D1 slightly delayed signal is applied to clear the register and is concurrently applied to a set of 8 parallel AND gates 111–118 connected with the stages of the shift register. As these gates are enabled, a channel byte is transferred from the shift register to a digit store 119 where the byte is stored until the next byte is released from the shift register. The output of the digit store 119 is placed on eight common data busses in the receiving apparatus.

Eight AND gates 122–128 and 129 are provided in the receiving channel unit 10' which are respectively connected to the eight data busses to respectively receive data digits 2 through 8 and data digit 1. The gates 122–129 are also connected with the respective digit busses from the digit generator 104 to be successively enabled by the respective occurrence of digits 2 through 8 and digit 1. Furthermore, these gates are also connected with the channel 1 terminal of the channel counter 105 so that they are enabled during the occurrence of channel 1.

The outputs of the gates 122–129 are respectively connected to the separate stages D2–D8 and D1 of a temporary store 130. Thus, when channel 1 occurs the received digits from the store 119 are successively entered into the stages of the temporary store 130 in the channel unit.

To clear the temporary store 130, a set of output AND gates 132–138 are provided respectively connected with the D2–D8 stages of the temporary store. Another AND gate 139 is provided which is connected with the D1 stage of the temporary store. The output terminals of the gates 132–138 are respectively connected to the stages S2 through S8 of a seven stage shift register 140.

The purpose of the temporary store 130 is to store the digits of the channel 1 byte until the whole byte is received. To clear the store an AND gate 142 is provided having one input connected with the D2 digit buss from the digit generator 104 and having a second input connected with any channel terminal of the channel counter which occurs soon after channel 1, preferably channel 2. Thus, when the first digit D2 of channel 2 occurs, the gate 142 provides an output signal. This output is connected with the gates 132–138 to clear the temporary store of its digits and thereby enter them in the respective stages S2–S8 of the shift register 140. The output of the gate 142 is also applied to the gate 139 to clear the D1 stage of the store 130. The output of the gate 139 is connected with the set terminal of a bistable circuit 143 so that the received D1 digit is applied to this bistable circuit when the store is cleared. The output of the gate 142 is also applied to all of the stages of the temporary store 130 to reset the store for receiving the next channel byte.

An AND gate 145 is provided taking a first input from the D1 buss carrying the digit 1 signal from the digit generator 104 and taking a second input from the channel 1 terminal of the channel counter 105. Thus, immediately before the temporary store is cleared, i.e., when the last digit D1 is entered in the store, the gate 145 provides an output pulse. This pulse is applied to the reset terminal of the bistable circuit 143 and resets it. The bistable circuit 143 is wired to provide a zero output when it is in the set condition and to provide a 1 output when it is in the reset condition. This circuit remains reset until it receives the D1 digit through the gate 139 when the temporary store is cleared. At this point, it will either remain reset if the D1 digit was transmitted in the zero condition or it will become set if the D1 digit was transmitted stuffed. Thus, if D2 through D8 time slots were transmitted all carrying valid data, then the bistable circuit 143 becomes set. If the D1 time slot was transmitted with a zero, then this circuit is reset immediately after the store 130 is cleared. This results in a "1" at its output terminal signifying that only six of the seven time slots allocated for carrying data are carrying valid data.

The clear signal from the gate 142 used to clear the store is applied to a six digit counter 146 to reset this counter to start its count. An internally generated clock signal is provided by a clock dividing down circuit 147 which receives an input from the clock extraction circuit 101 and provides an internally generated clock signal having a pulse repetition rate synchronous with the long term average digit rate of the channel. This clock signal is applied to the six digit counter 146. The next beat of this clock signal following the occurrence of the clearing of the temporary store 130, resets this counter and starts it counting to 6. The counter 146 is adapted to provide a continuous 1 at its output after completion of its count until it is reset. The output of this counter is connected with an AND gate 148 which is also connected with the output of the bistable circuit 143. The output of the gate 148 is connected with a conventional inverter 149 which inverts this output from zero to 1 or from 1 to zero, whichever the case, and applies this inverted signal to an AND gate 150. The second input of the gate 150 is taken from the clock circuit 147. The output of the gate 150 is connected with the S8 stage of the shift register 140 to shift the received data out of this register.

If D1 was transmitted high, or stuffed, signifying that all seven of the balance of the time slots carry valid data, then the output of gate 139 sets the bistable circuit 143 to provide a zero at its output. This zero provides a zero output at the gate 148 which is inverted and applied as a 1 to the gate 150 so that the shift register can be shifted uninterruptedly with each beat of internally generated clock signal. If the D1 digit was transmitted in the zero condition signifying that only six of the seven remaining time slots carry valid data, the bistable circuit 143 remains in the reset condition when the temporary store 130 is cleared into the shift register. The resulting 1 output of the bistable circuit 143 provides a 1 input to the gate 148. This gate has no output until the counter 146 counts six beats of the internal clock signal, which pass through the gate 150 uninterruptedly shifting the first 6 stages of the shift register, and when the counter 146 completes its counts, it provides a 1 output. This output from the counter results in an output 1 from the gate 148, which is inverted to zero which is in turn applied to the gate 150 inhibiting the seventh beat of the internally generated clock signal from shifting the shift register. Thus, the output of the shift register 140 is a serial stream of digits in groups of seven and an occasional byte of six digits when only six valid digits of data were transmitted. A serial output of this data is taken from the S2 stage of the shift register by a conductor 155.

An AND gate 151 is provided which receives a first input from the gate 148 and a second input from the input of the counter 146. The output of the gate 151 is connected with the S2 stage of the shift register 140 to reset this stage on the seventh beat of the counter thereby clearing the shift register of the seventh digit on all occurrences of the aforementioned inhibit.

It can be seen that the long term average discharge rate of the data from the shift register 140 is equal to the average digit rate that the data was originally introduced into the transmission apparatus. The reason for this is that the digits recovered by the shift register are only those digits transmitted carrying valid data and they are recovered at the average rate of transmission of the valid data. This is, in turn, equal to the data input rate at the transmitter due to the manner of operation of the two transmitter ring counters and the occasional stuffing of the D7 time slot.

To provide a uniform output rate of the data, a pair of ring counters 157, 158 are provided having single preset highs about 180° out of phase and which are coupled through an elastic store similar to the ring counter configuration in the transmitter. The conductor 155 carrying the data from the shift register is connected to the first input terminals of each of a group of AND gates 161–167. The second input terminals of these gates are respectively connected to the stages of a first ring counter 169. The ring counter is shifted by the same shift signal from the gate 150 which is used to shift the shift register. As the preset high in the ring counter 169 is shifted from stage to stage in synchronism with the data in the conductor 155, the gates 161–167 are sequentially enabled to pass the data digits to their respective output terminals. These output terminals are respectively connected to the set terminals of a group of bistable circuits 171–177 which serve as the elastic store. The number 1 output terminals of these bistable circuits are respectively connected to the first input terminals of a group of AND gates 181–187. The second input terminals of these gates are respectively connected to the respective stages of a second ring counter 190 which has its preset high about 180° out of phase with the preset high of the counter 169. The stages of the counter 190 are also respectively connected with the reset terminals of the bistable circuits 171–177. A 50 kilobit shift signal is applied to the first stage of the ring counter 190 through a conductor 191. The output terminals of the gates 181–187 are connected with a conductor 192 to carry the 50 kilobit data as an output from the channel unit 10'.

As the ring counter 190 is shifted, its preset high successively appears at the respective second input terminals of the gates 181–187 so that these gates are successively enabled to pass the data stored in the bistable circuits 171–177 to the output conductor 192 in the order the data was transmitted. The same pulses which respectively enabled the gates 181–187, reset the bistable circuits 171–177 so that these circuits can receive further data.

Similar to the transmission channel unit as discussed above, the preferred number of stages of the two ring counters and the bistable circuits depend upon the tolerance of the data rate and the difference between the long term average digit rate of the channel and the digit rate of the data that, preferably introduced into the transmission apparatus. It can be seen that, preferably, the same number of stages of these circuits be used in the receiving channel unit as are used in the transmitting channel unit.

The output of the last stage of ring counter 169 is also connected with the reset terminal of a phase comparator 193 in the form of a bistable circuit. The set terminal of the phase comparator 193 is connected with the last stage of the ring counter 190. The output 1 terminal of the phase comparator, is connected with a low pass filter 194 the output of which is, in turn, connected with a conventional voltage controlled oscillator 195. The output of the voltage controlled oscillator is connected with the conductor 191. The low pass filter 194 is calibrated to provide no error signal to the voltage controlled oscillator when it is subjected to a square wave relationship between its set and reset events. This occurs when the ring counter 190 is shifted at the same rate as the ring counter 169 which is, in turn, shifted at a rate equal to the average digit rate of the data entering the transmitter.

Any deviation from a square wave at the input of the low pass filter 194, will result in an error signal provided thereby which, acting through the voltage controlled oscillator, will pull its output frequency in the appropriate direction so that the long term average output frequency of the voltage controlled oscillator will be the same as the 50 kilobit data rate introduced into the transmitter. Also, variations of the oscillator's output will be smoothed by the low pass filter. The signal thus provided by the voltage controlled oscillator 195 is placed on the conductor 191, which carries this signal as an output clock signal from the channel unit 10' and is in synchronism with the output data signal on the conductor 192.

It can be appreciated by those skilled in the art, that the receiving and transmitting channel circuits described above can be joined in a single channel unit which can be arranged as an interchangeable module in a TDM terminal capable of both transmission and reception. Also, the channel circuits as described herein require no modifications in the fundamental design of the balance of the TDM transmission system rendering the channel unit readily adaptable to known TDM terminal equipment.

While the principals of the invention have been made clear in the above illustrative embodiment, there will be immediately obvious to those skilled in the art, many modifications in structure, arrangement, proportions, the elements, materials, and components, used in the practice of the invention, and otherwise, which are particularly adapted for specific operating requirements, without departing from those principles of the invention. The appended claims are therefore intended to cover and embrace any such modifications, within the limits only of the true spirit and scope of the invention.

I claim:

1. Apparatus for transmitting binary data over a predetermined group of transmission digit time slots of a predetermined channel of a multiple channel time division multiplex transmission system wherein said data is first introduced from a source thereof into said system at an average first digit rate and wherein the long term average digit rate of said predetermined group of transmission digit time slots of said channel exceeds said first digit rate, comprising in combination:

a. means including a digit time slot generator and channel counter at the transmitting terminal of said transmission system for generating a time division multiplex transmission format comprised of a plurality of serially arranged transmission channels each having a plurality of consecutively occurring transmission digit time slots of one binary digit each;

b. means at the transmitting terminal of said transmission system for storing said data at least until a plurality of data digits thereof is received into said apparatus for transmission over said predetermined channel;

c. means at said transmitting terminal responsive to said means (a) for transmitting said stored data in the form of digital bytes comprised of a plurality of said data digits over said predetermined group of transmission digit time slots of said channel on the occurrence of said channel within a time division multiplex frame;

d. means at said transmitting terminal for periodically stuffing by transmitting a transmission digit of a predetermined state in at least a first transmission digit slot of said predetermined group of digit time slots of said channel transmitting said data and for providing a stuffing indicating signal in another transmission digit slot of said predetermined group of digit time slots to signal the receiving terminal of said transmission system on each occurrence of said stuffing, said stuffing and signalling being performed at a rate sufficiently high to provide substantially for long term equality between the long term average digit rate of said predetermined group of transmission digits and the sum of said average first digit rate of said data added to said stuffing and signalling rate;

e. detecting means at said receiving terminal for detecting said stuffing indicating signal in said other transmission digit slot; and f. means in said receiving terminal responsive to said detecting means (e) for reconstructing said binary data at an average digit rate substantially equal to said first digit rate by recovering the digits of said predetermined group of digits transmitted in said channel less the digits of said first and other transmission digit slots used for said stuffing and signalling.

2. Apparatus for transmitting binary data over a predetermined channel of a multiple channel time division multiplex transmission system wherein said data is first introduced from a source thereof into said system at an average first digit rate and wherein the long term average digit rate of said predetermined channel exceeds said first digit rate, comprising in combination:

a. means including a digit time slot generator and channel counter at the transmitting terminal of said transmission system for generating a time division multiplex transmission format comprised of a plurality of serially arranged transmission channels each having a plurality of consecutively occurring transmission digit time slots of one binary digit each;

b. means at the transmitting terminal of said transmission system for storing said data at least until a plurality of digits thereof is received into said apparatus for transmission over said predetermined channel;

c. means at said transmitting terminal responsive to said means (a) for transmitting said stored data in the form of digital bytes comprised of a plurality of said data digits over said predetermined channel on the occurrence of said channel within a time division multiplex frame;

d. means at said transmitting terminal for periodically stuffing by transmitting a transmission digit of a predetermined state in at least a first transmission digit slot of said predetermined channel transmitting said data and for providing a stuffing indicating signal in another transmission digit slot of said channel to signal the receiving terminal of said transmission system on each occurrence of said stuffing, said stuffing and signalling being performed at a rate sufficiently high to provide substantially for long term equality between the long term average digit rate of said channel and the sum of said average first digit rate of said data added to said stuffing and signalling rate;

e. means at said receiving terminal for storing the received digits of said channel at least until the entire byte of said channel is received;

f. means at said receiving terminal coupled with said storing means (e) for detecting said stuffing indicating signal in said other transmission digit slot; and g. means at said receiving terminal responsive to said detecting means (f) for reconstructing said binary data at an average recovery digit rate substantially equal to said first digit rate by reading out of said storing means (e) at said recovery digit rate said received digits of said channel less the respective digits of said first and other transmission digit slots used for said stuffing and signalling.

3. Apparatus for transmitting binary data over a predetermined channel of a multiple channel time division multiplex transmission system wherein said data is first introduced from a source thereof into said system at an average first digit rate and wherein the long term average digit rate of said predetermined channel exceeds said first digit rate, comprising in combination:

a. means including a digit time slot generator and channel counter at the transmitting terminal of said transmission system for generating a time division multiplex transmission format comprised of a plurality of serially arranged transmission channels each having a plurality of consecutively occurring transmission digit time slots of one binary digit each;

b. means at the transmitting terminal of said transmission system for storing said data at least until a plurality of digits thereof is received from said source for transmission over said predetermined channel;

c. means at said transmitting terminal responsive to said means (a) for transmitting said stored data in the form of digital bytes comprised of a plurality of said data digits over said predetermined channel on the occurrence of said channel within a time division multiplex frame;

d. means at said transmitting terminal operatively coupled with said means (b) and (c) for reading prior to transmission thereof said binary data out of said storing means (b) in the form of said digital bytes and at an instantaneous digit read-out rate substantially equal to said long term average digit rate of said channel;

e. means at said transmitting terminal operatively coupled with said reading means (d) for periodically stuffing said bytes provided by said reading means (d) by periodically inserting therein a first digit of predetermined state, and for providing a stuffing indicating signal by inserting therein a second digit of predetermined state on each occurrence of said stuffing, said stuffing means (e) including means for performing said stuffing and signal inserting at a rate sufficiently high to provide substantially for a long term equality between said long term average digit rate of said channel and the sum of said average first digit rate of said data added to said stuffing and signal inserting rate, said stuffing means (e) including further means for arranging said inserted first and second digits in said bytes in predetermined order to respectively occupy predetermined first and second transmission digit time slots of said predetermined transmission channel;

f. means at said receiving terminal for storing the received digits of said channel at least until the entire byte of said channel is received;

g. means at said receiving terminal coupled with said storing means (f) for detecting said stuffing indicating signal in said second transmission digit time slot; and h. means at said receiving terminal responsive to said detecting means (g) for reconstructing said binary data at an average recovery digit rate substantially equal to said first digit rate by reading out of said storing means (f) at said recovery digit rate said received digits of said channel less the digits used for said stuffing and signalling.

4. The apparatus of claim 3 wherein said apparatus includes means for providing N transmission digit time slots in said channel and wherein said stuffing means (e) comprises:

e. a shift register including at least N series connected stages the first stage of which is connected with said read-out means (d) for accepting said data read-out thereof;

means for shifting said register at a rate equal to said digit read-out rate to advance the digits of said data to successive stages of said register;

means for periodically discharging said shift register of its contents in the form of said digital bytes comprised of N digits for transmission;

means for stuffing the ($N$–1)th stage of said register by providing a high state therein and for providing a zero in the Nth stage on each said occurrence of said stuffing to provide said stuffing in the form of a stuffed high ($N$–1)th transmission digit slot of said channel and to provide said signal in the form of a zero in the Nth transmission digit slot of said channel; and means for stuffing high the Nth stage of said register for each byte of said channel which is not subjected to said sufficiently frequent stuffing whereby said Nth transmission digit slot of said channel is normally transmitted stuffed high and when said stuffing occurs in said ($N$–1)t h transmission digit slot said receiving terminal is signalled thereof by a zero in said Nth transmission digit slot.

5. The apparatus of claim 4 wherein said detecting means (g) in said receiving terminal includes a bistable circuit connected therein to receive said Nth transmission digit slot to assume a first state in response to a zero in said Nth transmission digit slot and to assume a second state in response to a stuffed Nth transmission digit slot; and wherein said reconstructing means (h) at said receiving terminal comprises:

h. a shift register including at least $N$–1 series connected stages connected with said storing means (f) for each of said stages to accept a received digit of said channel less the digit of said Nth digit slot;

means for shifting said received digits out of said register at a digit rate at least equal to the average digit rate of $N$–1 digits of said channel to provide a serial output digital signal; and means responsive to said bistable circuit for inhibiting the shifting of the digit of said ($N$–1)th transmission digit slot out of said shift register when said bistable circuit is in its first state whereby said output of said shift register is caused to exclude said ($N$–1)th digit on each occurrence thereof in said stuffed condition, whereby the digits of said shift register output signal correspond to the digits of said binary data as introduced into said apparatus for transmission.

6. Apparatus for transmitting binary data digits in the form of digital bytes comprised of a plurality of said data digits over a predetermined channel of a multiple channel time division multiplex transmission system wherein said binary data is first introduced from a source thereof into said system at an average first digit rate and wherein the long term average digit rate of said predetermined channel exceeds said first digit rate, comprising in combination:

a. means including a digit time slot generator and channel counter at the transmitting terminal of said transmission system for generating a time division multiplex transmission format comprised of a plurality of serially arranged transmission channels each having a plurality of consecutively occurring transmission digit slots of one binary digit each;

b. storage means at the transmitting terminal of said transmission system for storing said data at least until a plurality of digits thereof is received from said source for transmission over said predetermined channel;

c read-out means at said transmitting terminal for reading out of said storage means (b) in serial form said binary data at an instantaneous digit read-out rate substantially equal to said average digit rate of said channel;

d. inhibit means at said transmitting terminal for periodically inhibiting said read-out means (c) for substantially the time interval of one digit of said read-out rate, said inhibiting being performed sufficiently frequent to provide an average effective read-out rate of said data substantially equal to said first digit rate;

e. means including a shift register at said transmitting terminal coupled to said read-out means and said inhibit means for registering said read-out data and for releasing it in the form of said data bytes for transmission over said channel;

f. means associated with said shift register responsive to said inhibit means for stuffing a first transmission digit slot of said data byte by inserting a first digit of predetermined state and for providing a stuffing indicating signal by inserting a second digit of predetermined state in another transmission digit slot of said byte on each occurrence of said inhibiting;

g. means including a plurality of transmission gates at said transmitting terminal for transmitting said data bytes including said first and second digits over said predetermined channel;

h. means at the receiving terminal of said transmission system for storing the received digits of said channel at least until the entire byte of said channel is received;

i. detecting means at said receiving terminal for detecting said stuffing indicating signal in said other transmission digit slot;

j. read-out means at said receiving terminal for reading out of said storing means (h) said received channel byte less said other digit slot at a read-out rate substantially equal to said average digit rate of said channel;

k. means at said receiving terminal responsive to said detecting means (i) for inhibiting said read-out means (j) from reading out said stuffed first digit slot of said byte in response to said indicating signal in said other digit slot, whereby the average read-out rate of said means (j) is substantially equal to said first digit rate; and l. output means at said receiving terminal coupled with said read-out means (j) for providing an output binary data signal at a digit rate substantially equal to said first digit rate thereby corresponding to said binary data introduced into said system for transmission.

7. The apparatus of claim 6 wherein said binary data is sequentially received in said apparatus at said average first digit rate, wherein said read-out means (c) include; a clock signal generating circuit for generating a series of timed pulses the repetition rate of which is substantially equal to said average digit rate of said channel, a ring counter coupled with said clock circuit and having a high state preset in one stage driven around said ring counter by said clock circuit, and gateing means operatively coupled with said storage means (b) and coupled with said ring counter responsive to said driven preset high for sequentially reading said data out of said storing means (b) at said digit rate of said channel; and wherein said inhibit means (d) include; an inhibit gate coupled with said ring counter for periodically inhibiting said data reading by said counter for one digit of said reading out, and means for applying an inhibit signal to said inhibit gate sufficiently frequent to provide said average effective read-out rate of said data by said counter.

8. The apparatus of claim 7 wherein said storing means (h) in said receiving terminal include a plurality of parallel storage stages connected in said receiving terminal for each to receive and store a received digit of said channel, said plurality of storage stages being sufficient in number to store the entire byte transmitted in said channel less the digit of said other signalling digit slot, wherein said read-out means (j) in said receiving terminal include; a receiver clock signal generating circuit for generating a series of timed pulses the repetition rate of which is substantially equal to said average digit rate of said channel, and a series connected shift register including a plurality of stages equal in number to the number of said storage stages wherein each said register stage is connected with a storage stage to read therefrom said stored digits, wherein said shift register is driven by said receiver clock to read-out of said storage stages in serial form said received binary data at said instantaneous digit read-out rate and wherein said shift register is connected with said inhibit means (k) for inhibiting said shift register from shifting into said serial output thereof said stuffed first transmission digit slot in response to said detecting means.

9. A method for transmitting binary data over a predetermined channel of multiple channel time division multiplex transmission system wherein said data is first introduced from a source thereof into said system at an average first digit rate and wherein the long term average digit rate of said predetermined channel exceeds said first digit rate, comprising the steps of:

a. generating a time division multiplex transmission format comprised of a plurality of serially arranged transmission channels each having a plurality of consecutively occurring transmission digit time slots of one binary digit each;
b. periodically stuffing by transmitting in a predetermined first state a first transmission digit time slot of said channel and providing a stuffing indicating signal in another transmission digit time slot thereof on each occurrence of said stuffing to signal the receiving facility of said transmission system of the occurrence of said stuffing, said stuffing and signalling being performed sufficiently frequent to provide an effective average digit rate of the transmission digit slots of said channel when not used for said stuffing and signalling substantially equal to said first digit rate;
c. arranging said data in the form of digital bytes for the transmission of a byte on each occurrence of said channel within a time division multiplex frame, each said byte including a plurality of said data digits sufficient in number to provide an average transmission rate of said data substantially equal to said first digit rate;
d. sequentially transmitting said bytes one on each occurrence of said channel; and
e. reconstructing said binary data at the receiving facility of said transmission system by reconstructing the received data of the transmission digit slots of said channel carrying said binary data, said reconstructing being performed at an average digit rate substantially equal to said first digit rate.

10. A method for transmitting binary data over a predetermined channel of multiple channel time division multiplex transmission system wherein said data is first introduced from a source thereof into said system at an average first digit rate and wherein the long term average digit rate of said predetermined channel exceeds said first digit rate, comprising the steps of:

a. generating a time division multiplex transmission format comprised of a plurality of serially arranged transmission channels each having a plurality of consecutively occurring transmission digit time slots of one binary digit each;
b. periodically stuffing by transmitting in a predetermined first state a first transmission digit time slot of said channel and providing a stuffing indicating signal in the form of a zero in another transmission digit time slot of said channel on each occurrence of said stuffing to signal the receiving facility of said transmission system of the occurrence of said stuffing;
c. stuffing by transmitting in the high state said other transmission digit slot on all occurrences of said channel when said first digit slot is not stuffed;

said stuffing and signalling of steps (b) and (c) being performed sufficiently frequent to provide an effective average digit rate of the transmission digit slots of said channel when not used for said stuffing and signalling substantially equal to said first digit rate;

d. arranging said data in the form of digital bytes for the transmission of a byte on each occurrence of said channel within a time division multiplex frame, each said byte including a plurality of said data digits sufficient in number to occupy all of the transmission digit slots of said channel carrying said byte except said other digit slot and except said first digit slot when stuffed;
e. sequentially transmitting said bytes one on each occurrence of said channel; and
f. reconstructing said binary data at the receiving facility of said transmission system by reconstruction the received data of the digit slots of said channel carrying said binary data, said reconstructing being performed at an average digit rate substantially equal to said first digit rate.

* * * * *